(12) United States Patent
Hubers Van Assenraad

(10) Patent No.: US 12,184,617 B2
(45) Date of Patent: Dec. 31, 2024

(54) METHOD FOR ESTABLISHING TRUSTED DATA COMMUNICATIONS BETWEEN NETWORKS

(71) Applicant: Dull IP Pty Ltd, Melbourne (AU)

(72) Inventor: Todd Steven Hubers Van Assenraad, East Geelong (AU)

(73) Assignee: Dull IP Pty Ltd, Melbourne (AU)

( * ) Notice: Subject to any disclaimer, the term of this patent is extended or adjusted under 35 U.S.C. 154(b) by 8 days.

(21) Appl. No.: 18/336,408

(22) Filed: Jun. 16, 2023

(65) Prior Publication Data

US 2023/0336531 A1 Oct. 19, 2023

Related U.S. Application Data

(63) Continuation of application No. PCT/AU2021/051515, filed on Dec. 17, 2021.

(30) Foreign Application Priority Data

Dec. 18, 2020 (AU) ................................ 2020904728

(51) Int. Cl.
*H04L 9/40* (2022.01)
*H04L 61/256* (2022.01)
*H04L 67/14* (2022.01)

(52) U.S. Cl.
CPC .......... *H04L 63/029* (2013.01); *H04L 61/256* (2013.01); *H04L 67/14* (2013.01)

(58) Field of Classification Search
None
See application file for complete search history.

(56) References Cited

U.S. PATENT DOCUMENTS 6,493,349 B1 * 12/2002 Casey .................... H04L 45/00
370/409
9,729,562 B2 8/2017 Sonnenberg et al.
(Continued)

FOREIGN PATENT DOCUMENTS

CN 109508202 A 3/2019
EP 2421201 A1 2/2012

OTHER PUBLICATIONS

Australian Patent Office, International Search Report and Written Opinion for Application PCT/AU2021/051515 dated Feb. 24, 2022.
(Continued)

*Primary Examiner* — Backhean Tiv
(74) *Attorney, Agent, or Firm* — Honigman LLP

(57) ABSTRACT

A method for creating data communication between a requestor and a target, wherein: the requestor is associated with a first group and a first control agent; and the target is associated with a second group and a second control agent, the method comprising the steps of: receiving, at the first control agent, an intention to connect to the target from the requestor; identifying the second control agent as associated with the target and generating a request; communicating the request to the second control agent from the first control agent; receiving, from the second control agent, external configuration instructions; selecting, at least in part in accordance with the received external configuration instructions, one or more configurable first networking agents of the first group requiring configuration in order to create that data communication; determining, at least in part in accordance with the received external configuration instructions, first networking configuration instructions for each of one or more configurable first networking agents; and communicating said instructions to the, or each, said configurable first networking agents, thereby creating a first segment for (Continued)

connection to a second segment create by the second control agent, and associated system.

20 Claims, 10 Drawing Sheets

(56) References Cited

U.S. PATENT DOCUMENTS

| | | | | |
|---|---|---|---|---|
| 10,375,023 | B2* | 8/2019 | Palojärvi | H04L 63/0272 |
| 11,265,296 | B1* | 3/2022 | Uysal | H04L 63/0272 |
| 11,956,099 | B2* | 4/2024 | Norbutas | H04L 47/34 |
| 2004/0088542 | A1* | 5/2004 | Daude | H04L 63/08 |
| | | | | 713/153 |
| 2004/0095937 | A1* | 5/2004 | Piche | H04L 61/2567 |
| | | | | 370/392 |
| 2004/0128540 | A1* | 7/2004 | Roskind | H04L 63/0272 |
| | | | | 726/16 |
| 2004/0187028 | A1* | 9/2004 | Perkins | H04L 63/02 |
| | | | | 726/11 |
| 2008/0092229 | A1* | 4/2008 | Khanna | H04L 63/164 |
| | | | | 726/15 |
| 2011/0013776 | A1 | 1/2011 | McAlister | |
| 2013/0332724 | A1 | 12/2013 | Walters | |
| 2014/0153572 | A1 | 6/2014 | Hampel et al. | |
| 2016/0248858 | A1 | 8/2016 | Qiu et al. | |
| 2016/0261615 | A1 | 9/2016 | Sonnenberg et al. | |
| 2017/0063800 | A1* | 3/2017 | Young | H04L 12/4658 |
| 2017/0099159 | A1* | 4/2017 | Abraham | H04L 45/54 |
| 2019/0207784 | A1* | 7/2019 | Aizikovich | G06F 9/45558 |
| 2021/0203640 | A1* | 7/2021 | Hastings | H04L 9/0841 |
| 2022/0263804 | A1* | 8/2022 | Jasner | H04L 45/306 |

OTHER PUBLICATIONS

Qian et al.—Application of Embedded Ethernet Communication Interface in Receiver—[J]. China Computer and Network, Mar. 11, 2011 (7); pp. 49-52. [English Abstract].
Rieger G.: "socat—Handling all Kinds of Sockets", NETCAT, 2007, XP055818510 URL: <http://www.dest-unreach.org/socat/doc/linuxwochen2007-socat.pdf>.
Rieger G.: "Executing programs using socat", dest-unreach.org, 2009, XP055818511 URL (web archive for Aug. 24, 2018): <https://web.archive.org/web/20180824003739/http://www.dest-unreach.org/socat/doc/socat-exec.html>.
Plagemann T: "A Framework For Dynamic Protocol Configuration", European Transactions on Telecommunications, Wiley & Sons, Chichester, GB, vol. 10, No. 3, May 1, 1999 (May 1, 1999), pp. 263-273.
Yu et al: "Establishing TCP connections between hosts behind NATs", EPO Form 1703 01 .91 TRI IET International Conference on Wireless, Mobile and Multimedia Networks 2006 : Nov. 6-9, 2006, Hangzhou, China, Jan. 1, 2006 (Jan. 1, 2006), p. 103.
"Configuration", Consul By Hashicorp, 2019, XP055818515 URL (web archive for Sep. 29, 2019): <https://web.archive.org/web/20190929120558/https://www.consul.io/docs/agent/options.html>.
EPO, Extended European Search Report for Application No. 21904669.5 dated Oct. 23, 2024.
Anonymous: "Cisco 4000 Series ISRs Software Configuration Guide, Cisco IOS XE Gibraltar 16.12.x—Session Initiation Protocol Triggered VPN [Cisco 4000 Series Integrated Services Routers] —Cisco", Aug. 13, 2019 (Aug. 13, 2019), XP093214419, Retrieved from the Internet: URL:https://www.cisco.com/c/en/us/td/docs/routers/access/4400/ software/configuration/xe-16-12/isr4400swcfg-xe-16-12-book/isr4400swcfg-xe-16-8-book_chapter_011001.html.

* cited by examiner

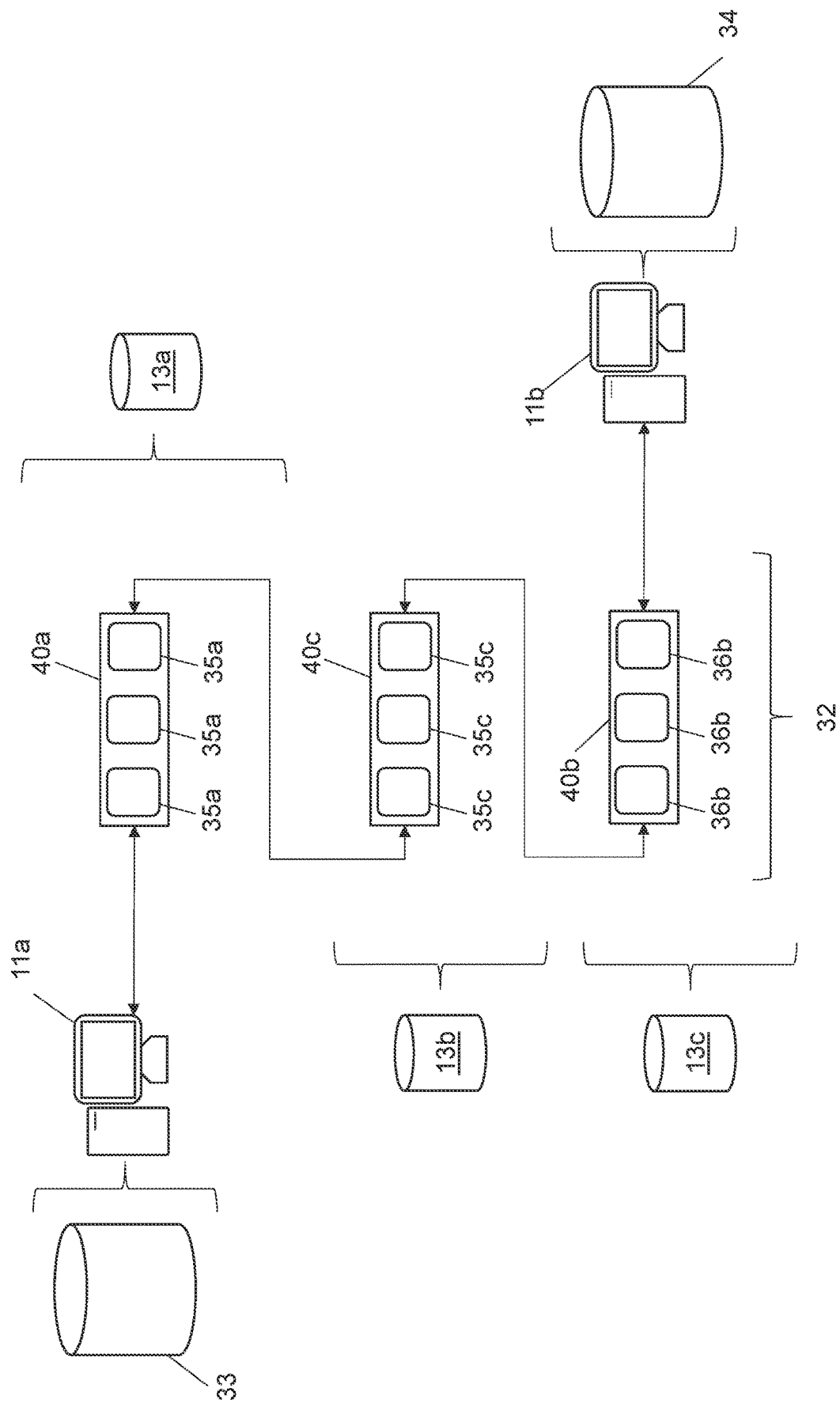

METHOD FOR ESTABLISHING TRUSTED DATA COMMUNICATIONS BETWEEN NETWORKS

CROSS REFERENCE TO RELATED APPLICATION

This application is a continuation of Patent Cooperation Treaty Application No. PCT/AU2021/051515, filed on Dec. 17, 2021, which claims the benefit of earlier filed Australian Application No. 2020904728, filed on Dec. 18, 2020. The disclosures of these prior applications are considered part of the disclosure of this application and are hereby incorporated by reference in their entireties.

FIELD

The invention generally relates to methods and systems for data communication via a network, for example, configurable network communication.

BACKGROUND

Network tunneling is known, where two private networks can be virtually connected via a public network. However, such tunneling methods typically lack flexibility and versatility. This limits latency, throughput, reliability, reach, and potential new capabilities. Also, present tunneling technologies typically require a centralized controller to restrict packets with a firewall allowing only authorized communication. This can result in limitations regarding performance (e.g. latency) and may result in a central point of failure.

SUMMARY

In an embodiment, a method for creating data communication between a requestor and a target, wherein: the requestor is associated with a first group and a first control agent; and the target is associated with a second group and a second control agent, the method comprising the steps of: receiving, at the first control agent, an intention to connect to the target from the requestor; identifying the second control agent as associated with the target and generating a request; communicating the request to the second control agent from the first control agent; receiving, from the second control agent, external configuration instructions; selecting, at least in part in accordance with the received external configuration instructions, one or more configurable first networking agents of the first group requiring configuration in order to create that data communication; determining, at least in part in accordance with the received external configuration instructions, first networking configuration instructions for each of one or more configurable first networking agents; and communicating said instructions to the, or each, said configurable first networking agents, thereby creating a first segment for connection to a second segment create by the second control agent.

In an embodiment, the data communication is over, at least in part, a data network such as the Internet. In another embodiment, the data communication is via a memory shared by the requestor and the target.

Typically, the request comprises a predefined data structure suitable for processing by the second control agent.

The requestor may also be a configurable networking agent and is identified as required for creating the data communication.

In an embodiment, the external configurations specify an IP address and/or port for outgoing communications. The requestor may be a configurable networking agent and may be configured to address outgoing packets to said IP address and/or port. At least one configurable networking agent may be configured to address outgoing packets to said IP address and/or port.

At least one configurable networking agent may comprise a security protocol and the first networking configuration instructions may include configuring the security protocol.

At least one configurable networking agent may be configured to communicate with a rendezvous point server and the first networking configuration instructions may include instructions to enable communication with the rendezvous point server to facilitate setting up the data communication.

At least one configurable networking agent may comprise a firewall and the first networking configuration instructions may include information to configure the firewall to enable communications from the target to reach the requestor.

At least one configurable networking agent may comprise a NAT and the first networking configuration instructions may include information to configure the NAT to enable communications from the target to reach the requestor.

At least one configurable networking agent may comprise a logger for logging data transmitted between the requestor and the target, and the first networking configuration instructions may include information to configure the logger.

The method may further comprise a step of: the first control agent exchanging capability information with the second control agent. Selecting the one or more configurable first networking agents and/or determining the first networking configuration instructions may be based, at least in part, on the exchanged capability information.

The method may further comprise the step of: checking permissions associated with the intention and ceasing creation of the data communication in response to determining that the permissions do not satisfy a permission requirement.

In an embodiment, a method for creating data communication between a requestor and a target, wherein: the requestor is associated with a first group and a first control agent; and the target is associated with a second group and a second control agent, the method comprising the steps of: receiving, at the second control agent, a request from the first control agent, wherein the request is for creating the data communication; determining one or more configurable second networking agents of the second group requiring configuration in order to create that data communication; determining second networking configuration instructions for each of one or more configurable second networking agents; communicating the second networking instructions to the one or more configurable second networking agents, thereby creating a second segment; determining external configuration instructions configured to enable the first control agent to create a first segment to connect to the second segment; and communicating the external configuration instructions to the first control agent.

In an embodiment, the data communication is over, at least in part, a data network such as the Internet. In another embodiment, the data communication is via a memory shared by the requestor and the target.

The request may comprise a predefined data structure suitable for processing by the second control agent.

The target may also be a configurable networking agent and is identified as required for creating the data communication.

The external configurations may specify an IP address and/or port for outgoing communications.

The target may be a configurable networking agent and is configured to receive incoming packets on a particular IP address and/or port.

At least one configurable networking agent may comprise a security protocol and the first networking configuration instructions may include configuring the security protocol.

At least one configurable networking agent may be configured to communicate with a rendezvous point server and the second networking configuration instructions may include instructions to enable communication with the rendezvous point server to facilitate setting up the data communication.

At least one configurable networking agent may comprise a firewall and the second networking configuration instructions may include information to configure the firewall to enable communications from the requestor to reach the target.

At least one configurable networking agent may comprise a NAT and the second networking configuration instructions may include information to configure the NAT to enable communications from the requestor to reach the target.

At least one configurable networking agent may comprise a logger for logging data transmitted between the requestor and the target, and the first networking configuration instructions may include information to configure the logger.

Selecting the one or more configurable second networking agents and/or determining the second networking configuration instructions may be based, at least in part, on the received request.

The method may further comprise a step of: the second control agent exchanging capability information with the first control agent.

Selecting the one or more configurable second networking agents and/or determining the second networking configuration instructions may be based, at least in part, on the exchanged capability information.

The method may further comprise the step of: checking permissions associated with the request and ceasing creation of the data communication in response to determining that the permissions do not satisfy a permission requirement.

In an embodiment, a method for creating data communication between a requestor and a target, wherein: the requestor is associated with a first group and a first control agent; and the target is associated with a second group and a second control agent, the method comprising the steps of: receiving, at the first control agent, an intention to connect to the target from the requestor; identifying, by the first control agent, the second control agent as associated with the target and generating a request; communicating, from the first control agent, the request to the second control agent from the first control agent, wherein the request is for creating the data communication; receiving, at the second control agent, the request from the first control agent; determining, by the second control agent, one or more configurable second networking agents of the second group requiring configuration in order to create that data communication; determining, by the second control agent, second networking configuration instructions for each of one or more configurable second networking agents; communicating, by the second control agent, the second networking instructions to the one or more configurable second networking agents, thereby creating a second segment; determining, by the second control agent, external configuration instructions configured to enable the first control agent to create a first segment to connect to the second segment; and communicating, from the second control agent, the external configuration instructions to the first control agent; receiving, from the second control agent, the external configuration instructions at the first control agent; selecting, by the first control agent, at least in part in accordance with the received external configuration instructions, one or more configurable first networking agents of the first group requiring configuration in order to create that data communication; determining, by the first control agent, at least in part in accordance with the received external configuration instructions, first networking configuration instructions for each of one or more configurable first networking agents; and communicating, from the first control agent, said instructions to the, or each, said configurable first networking agents, thereby creating a first segment for connection to a second segment create by the second control agent.

The method may further comprise the step of: undertaking communications between the requestor and the target using a pathway corresponding to the created first segment and second segment.

In an embodiment, a method for creating data communication between a requestor and a target, wherein: the requestor is associated with a first group and a first control agent; and the target is associated with a second group and a second control agent, the method comprising the steps of: receiving, at the first control agent, an intention to connect to the target from the requestor; identifying an additional control agent, being different to the second control agent, as associated with the target and generating a request; communicating the request to the additional control agent from the first control agent; receiving, from the additional control agent, external configuration instructions; selecting, at least in part in accordance with the received external configuration instructions, one or more configurable first networking agents of the first group requiring configuration in order to create that data communication; determining, at least in part in accordance with the received external configuration instructions, first networking configuration instructions for each of one or more configurable first networking agents; and communicating said instructions to the, or each, said configurable first networking agents, thereby creating a first segment for connection to a second segment create by the second control agent.

In an embodiment, a method for creating data communication between a requestor and a target, wherein: the requestor is associated with a first group and a first control agent; and the target is associated with a second group and a second control agent, the method comprising the steps of: receiving, at the second control agent, a request from an additional control agent, wherein the request is for creating the data communication between the target and requestor, wherein the additional control agent is different to the first control agent; determining one or more configurable second networking agents of the second group requiring configuration in order to create that data communication; determining second networking configuration instructions for each of one or more configurable second networking agents; communicating the second networking instructions to the one or more configurable second networking agents, thereby creating a second segment; determining external configuration instructions configured to enable the additional control agent to create an additional segment to connect to the second segment; and communicating the external configuration instructions to the first control agent.

In an embodiment, a control agent configured to implement any one or more of the above methods.

In an embodiment, a system comprising: a first control agent defining a first group comprising at least one first computer; and a second control agent defining a second group comprising at least one second computer, wherein the first control agent and second control agent are configured to exchange data between each other, wherein the first control agent is configured to: receive an intention to connect to a target from a requestor, wherein the requestor is associated with a first computer of the first group and the target is associated with a second computer of the second group; identify the second control agent as associated with the target and generate a request; and communicate the request to the second control agent, wherein the second control agent is configured to: receive the request from the first control agent; determine one or more configurable second networking agents of the second group requiring configuration in order to create that data communication; determine second networking configuration instructions for each of one or more configurable second networking agents; communicate the second networking instructions to the one or more configurable second networking agents, thereby creating a second segment; determine external configuration instructions configured to enable the first control agent to create a first segment to connect to the second segment; and communicate the external configuration instructions to the first control agent, and wherein the first control agent is further configured to: receive the external configuration instructions; select, at least in part in accordance with the received external configuration instructions, one or more configurable first networking agents of the first group requiring configuration in order to create that data communication; determine, at least in part in accordance with the received external configuration instructions, first networking configuration instructions for each of one or more configurable first networking agents; and communicate said instructions to the, or each, said configurable first networking agents, thereby creating a first segment for connection to the second segment, thereby creating a pathway.

The system may further comprise the one or more first networking agents and the one or more second networking agents. The requestor and the target may be applications running on their respective computers, and the requestor and target may be configured to undertake data communications according to the created pathway.

In an embodiment, a computer program comprising code configured to cause a computer to implement any one of the above methods when said code is executed by the computer.

In an embodiment, a computer readable storage medium comprising the above computer program.

As used herein, the word "comprise" or variations such as "comprises" or "comprising" is used in an inclusive sense, i.e. to specify the presence of the stated features but not to preclude the presence or addition of further features in various embodiments of the invention.

BRIEF DESCRIPTION OF THE DRAWINGS

In order that the invention may be more clearly understood, embodiments will now be described, by way of example, with reference to the accompanying drawing, in which:

FIGS. 10A and 10B relate to an embodiment utilizing additional segments.

DESCRIPTION OF EMBODIMENTS

Figure 1:
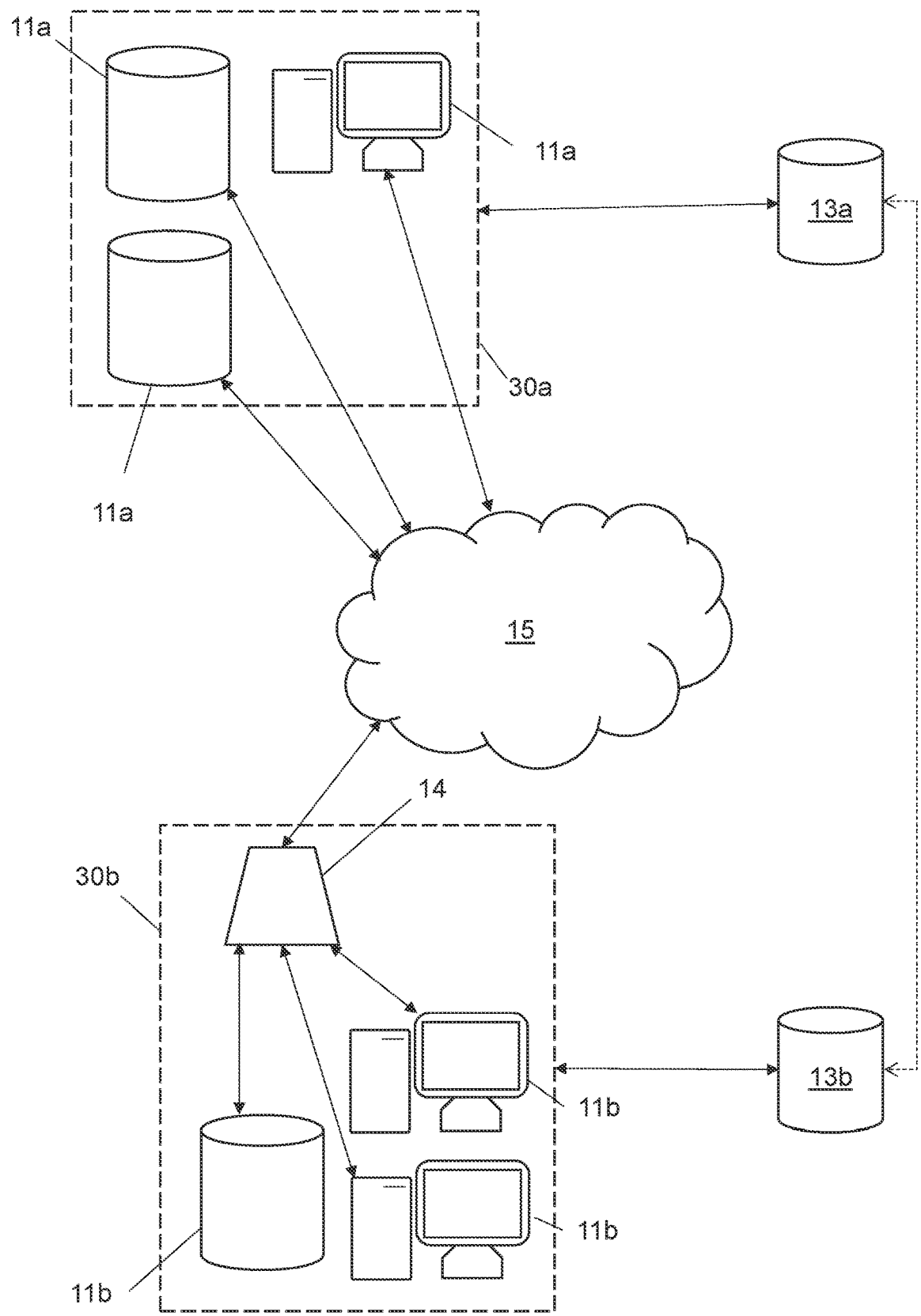
FIG. 1 shows a communication system according to embodiments.

FIG. 1 shows a communication system 10, representative of embodiments described herein. The system 10 includes several computers 11 in data communication with a network 15. The network 15 should be understood to represent any data interconnection enabling communications between computers 11—typically at least a portion of the network 15 will comprise a public network such as the Internet. The data communication may be based, at least in part, on the Internet Protocol (IP). However, other forms of data communication may be included, for example, portions of the data communication may comprise protocols such as Bluetooth or USB. In another form, the data communication may be between processes running on the same host—for example, via a memory pipe.

For the purposes of this disclosure, a computer 11 is considered to correspond to any suitable computing device having facility for data communication with one or more other computers 11 (for example, assumed herein to be via network 15 unless otherwise stated)—many implementations of such computers 11 exist, for example stand-alone computing hardware (e.g. desktop or laptop computers), standalone servers, distributed computing arrangements, mobile devices such as smartphones and tablets, and others. A computer 11 may, for example, correspond to a virtual computer implemented within a server environment, which can be a cloud service such as Amazon Web Services™. Therefore, two computers 11 may correspond to virtual computers implemented within the same server infrastructure.

FIG. 1 shows several computers 11a grouped into a first group 30a (referred to herein as "first" computers 11a) and several computers 11b grouped into a second group 30b (referred to herein as "second" computers 11b). Each group 30 is associated with a control agent 13 (e.g. first control agent 13a is associated with first group 30a and second control agent 13b is associated with second group 30b). Although, for schematic purposes, shown separately, the control agents 13 may be considered part of their respective group 30. A control agent 13 can be, for example, a program running on a computer 11a, 11b of one of the groups 30a, 30b, or may be implemented in a physically or logically distinct dedicated server (not specifically shown). More generally, groups 30 can be associated with specific applications running on the computers 11, such that a particular computer 11 can be associated with different groups 30 in dependence on the particular application being considered.

Also, the same computer 11 or, more generally, application can be associated with several groups 30 (therefore, several control agents 13).

In the first group 30a, the first computers 11a are shown in direct data communication with the network 15—for example, each first computer 11a can have an IPv6 address which is directly addressable from the network 15 (e.g. via the Internet). In the second group 30b, the second computers 11b are shown in data communication with a network address translation (NAT) server 14, which is itself in data communication with the network 15. Thus, each individual second computer 11b is not directly addressable via the network 15 but must be addressed via the NAT server 14, which is directly addressable from the network 15. The NAT server 14 is typically configurable, using port forwarding techniques, to allow incoming packets to be addressed to a specific second computer 11b. The examples shown of groups 30a, 30b are purely exemplary—generally, a group 30 can have a portion of the computers 11 directly addressable via the network 15 and/or a portion not directly addressable. Groups 30 can correspond to local intranets or subsets of a local intranets.

Figure 2:
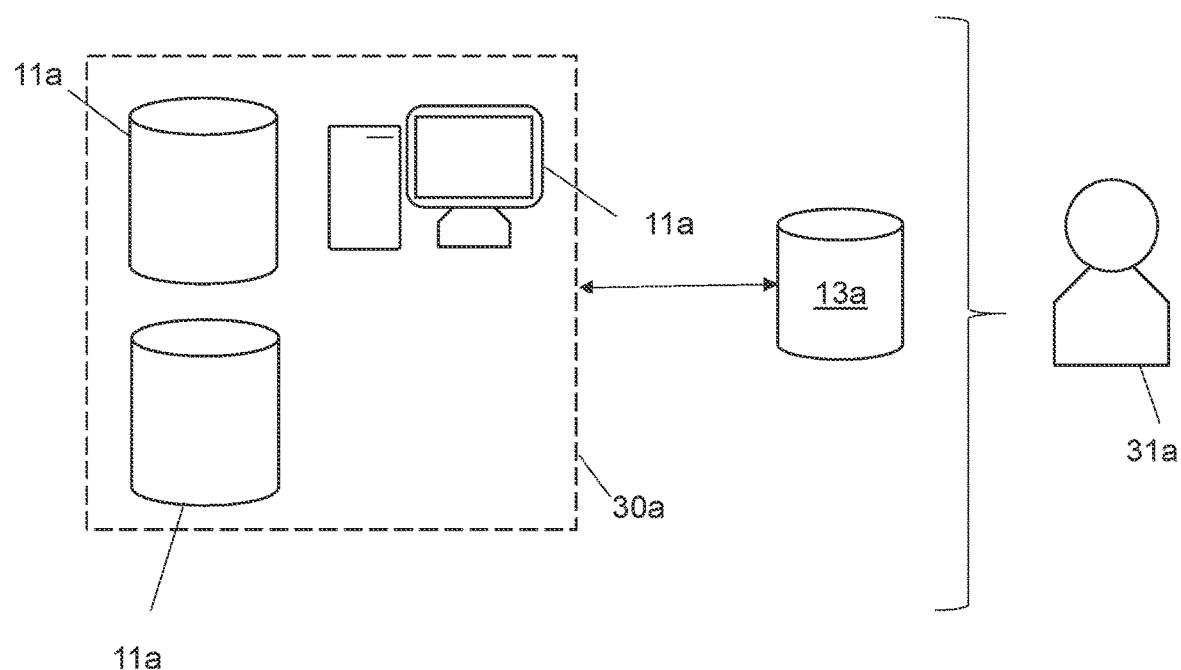
FIG. 2 shows a relationship between entities and groups, according to an embodiment.
Figure 2:
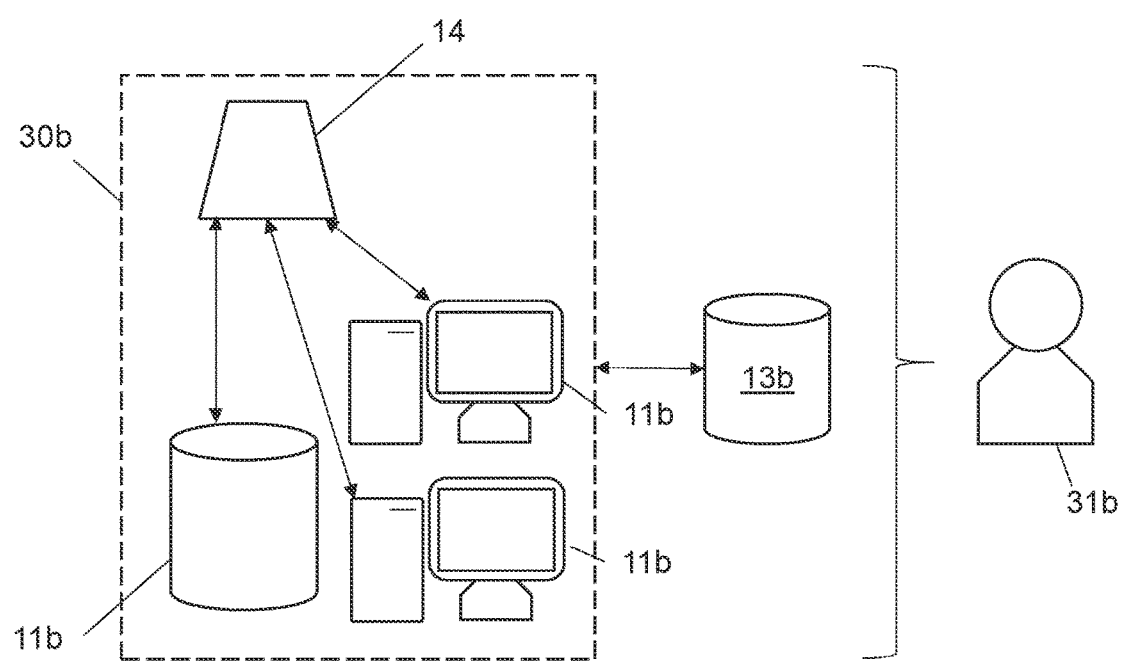

Referring to FIG. 2, a group 30 can also be associated with one or more entities 31. An entity 31 is a user of one or more computers 11 within the particular group 30. The term "entity" is used to imply any suitable user concept—for example, an individual or an organization, or a group within an organization (for example, an IT helpdesk). An entity 31 thereby utilizes a computer 11. As shown, entity 31a is associated with group 30a and entity 31b is associated with group 30b.

Figure 3:
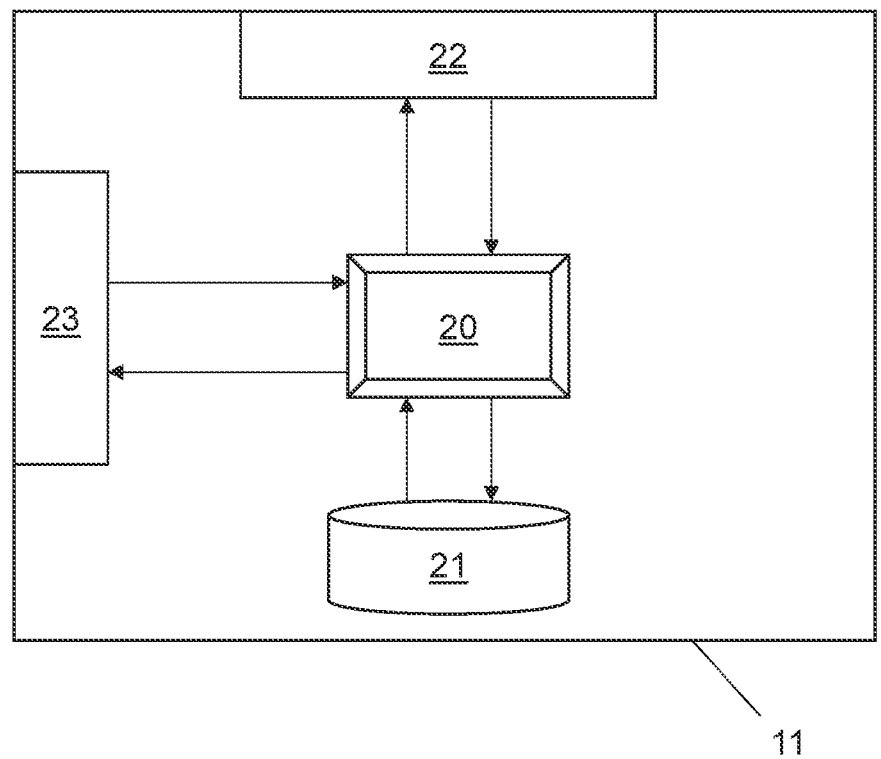
FIG. 3 shows a schematic representation of an exemplary computer.

Referring to FIG. 3, in a general sense, a computer 11 comprises a processor 20 interfaced with a memory 21 and a network interface 22. The processor 20 as shown can correspond, in practice, to a single CPU, a plurality of CPUs, a functionally interconnected network of a plurality of CPUs implemented in separated hardware, a microcontroller, etc. The memory 21 typically comprises a volatile memory and a non-volatile memory. The memory 21 is configured to store program instructions executable by the processor 20, and for providing a data space for storing data used by the program instructions.

The network interface 22 is configured to enable the processor 20 to communicate data over the network 15 and to receive data via the network 15. The network 15 shown in FIG. 1 should be interpreted as any interconnection of a plurality of devices—including computing devices as well as network nodes such as routers and switches. The connections can utilize wired electrical, optical, and wireless connections (typically a combination of many of these). Relevantly, the data communication is typically defined by one or more protocols—for example, the TCP/IP stack common for communications over the Internet. The network 15 can comprise a public network, such as the Internet. A computer 11 can also include a removable media port 23 configured to enable the computer 11 to read and write data to a removable data storage (not shown). This functionality can enable data communication according to embodiments herein described.

Referring back to FIG. 1, a first control agent 13a (that is, associated with the first group 30a) is shown. In practice, the data communication can be via any suitable channel for the present disclosure, it is assumed that the data communication is also via network 15, although this can not necessarily be required. Each control agent 13a, 13b is configured to communicate requests to the other control agent 13a, 13b (in a variation, it can that one control agent 13 is configured only to receive requests). Typically, there is a predefined communication protocol selected and configured to enable the communication between the control agents 13a, 13b. In an embodiment, the communication is via a messaging service, for example email. In another embodiment, the communication is via a file transfer protocol. In another embodiment, the control agents 13a, 13b are running specifically configured applications for enabling the required communications. It is also envisaged that "offline" communication channels can be utilized, for example via transport of a portable solid-state storage utilizing the removable media port 23. Generally, any suitable communication system can be utilized.

Figure 4:
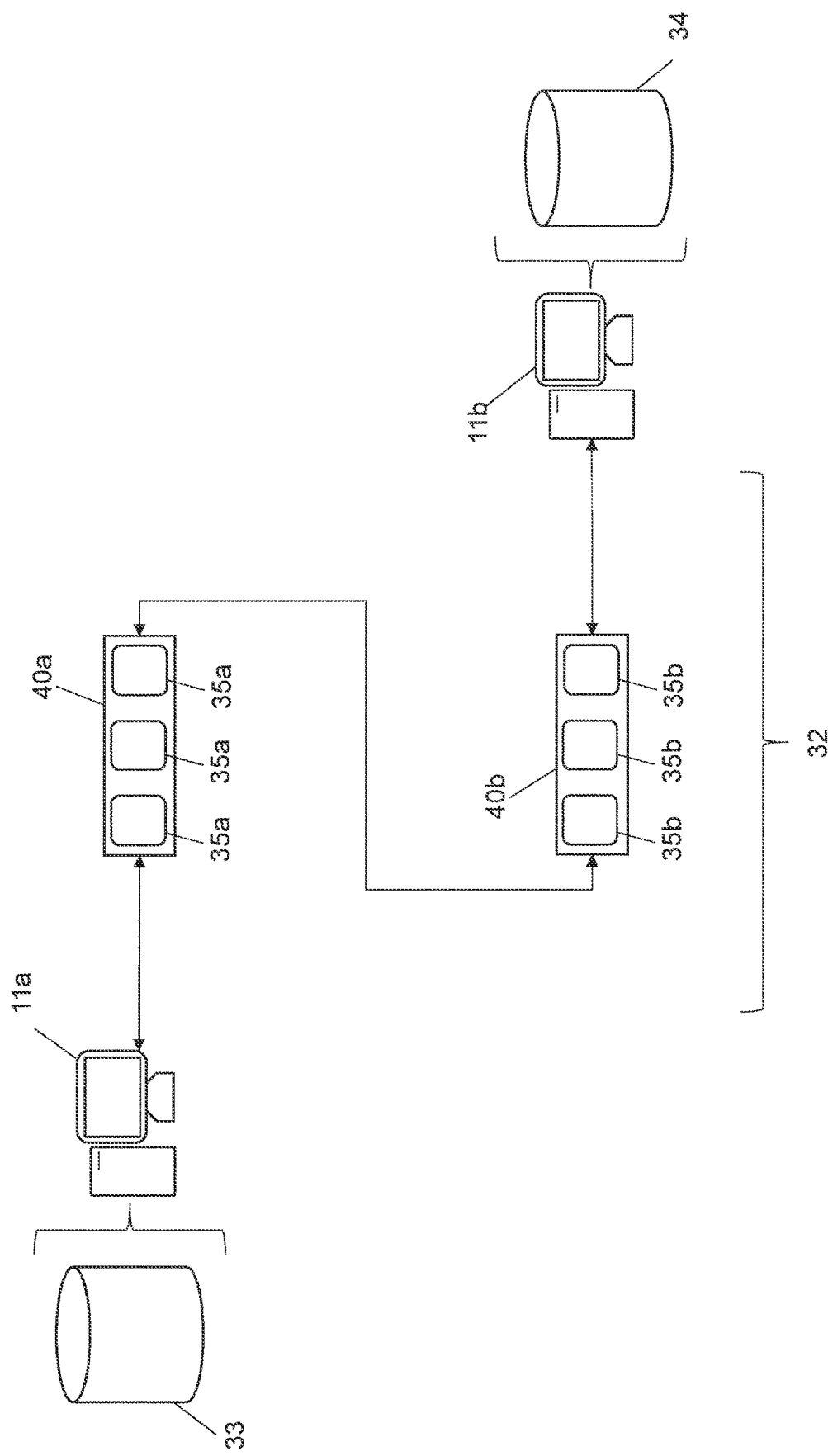
FIG. 4 shows a schematic representation of components of a pathway.
Figure 5:
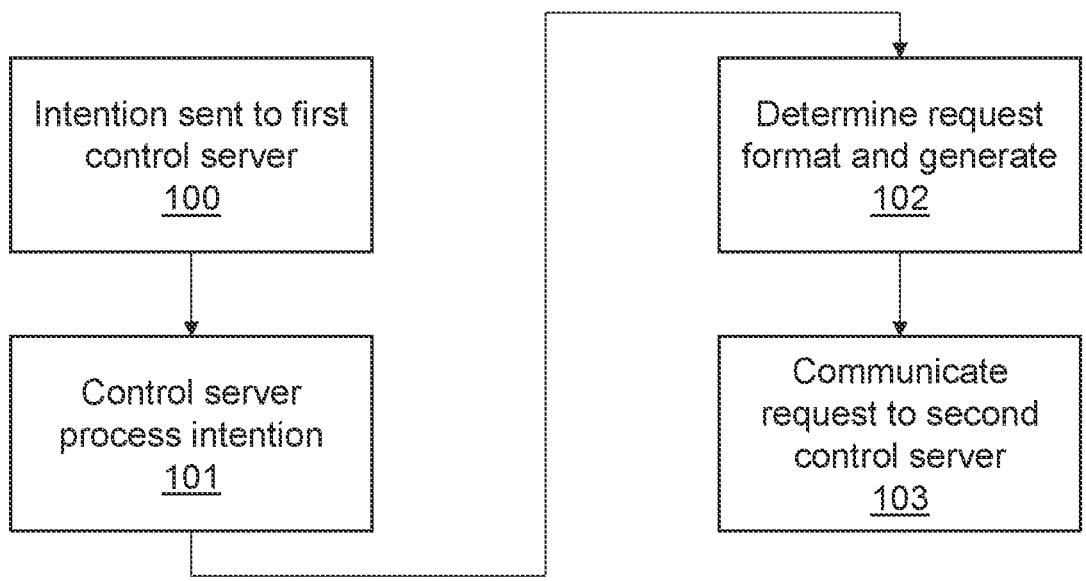
FIG. 5 shows a method undertaken by a first control agent for facilitating a pathway between a first computer of a first group and a second computer of a second group.
Figure 6:
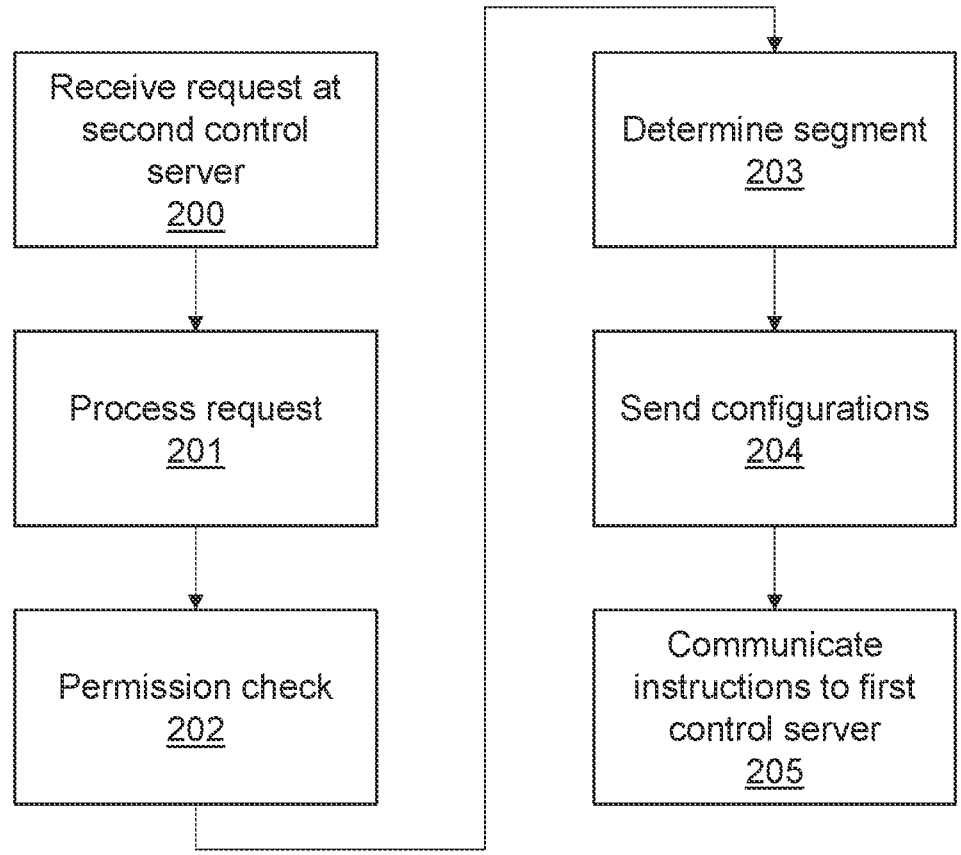
FIG. 6 shows a method undertaken by a second control agent for facilitating a pathway between a first computer of a first group and a second computer of a second group.

FIGS. 4 to 6 relate to an exemplary method showing the creation of a data connection between a first computer 11a of the first group 30a and a second computer 11b of the second group 30b. FIG. 4 shows an exemplary schematic representation of components of a pathway 32 between a requestor 33 and a target 34. A requestor 33 is an application associated with a first computer 11a which requires a data communication path to the target 34. The target 34 is an application running on a second computer 11b. In both cases, according to an embodiment, the term "application" should be understood as broad in scope—for example, an application can correspond to multiple applications or, in fact, the computer 11 itself.

The pathway 32 also includes one or more first networking agents 35a of the first group 30a and one or more second networking agents 35b of the second group 30b. The networking agents 35a, 35b comprise networking processes which participate, in some capacity, in initiating and/or maintaining the data communication path between the requestor 33 and the target 34. The networking agents 35a, 35b can be implemented as processes running on the same computers 11a, 11c as the requestor 33 and target 34 or on additional computers 11 (typically, there can be a mixture of networking agents 35a, 35b operating on the same computers 11a, 11b as the requestor 33 and target 34 and different computers 11).

At least one of the networking agents 35a, 35b is configurable—typically, at least one first networking agent 35a is configurable and at least one second networking agent 35b is configurable. Here, "configurable" implies that the operation within the segment 40 of the configurable networking agent 35a, 35b is at least in part configurable by its associated control agent 13a, 13b—for example, a configurable first networking agent 35a is at least in part configurable by the first control agent 13a and a configurable second networking agent 35b is at least in part configurable by the second control agent 13b. In the figure, the pathway 32 comprises a first segment 40a associated with the first group 30a and a second segment 40b associated with the second group 30b. The first segment 40a comprises the first networking agents 45 and the second segment 40b comprises the second networking agents 40b.

For the purposes of the present disclosure, segments 40 are described as connecting to other another segment 40 and/or a requestor 33 or target 34. For example, the first segment 40a connects the requestor 33 to the second segment 40b and, correspondingly, the second segment 40b connects the target 34 to the first segment 40a. As described herein, in some embodiments, additional segments 40 to the first segment 40a and the second segment 40b can be utilized. In this way, segments 40 link to create the pathway 32 between the requestor 33 and the target 34.

In an embodiment, the target 34 can be addressable such that data packets can directed to it. For example, the target 34 can be configured (or in fact, can be dynamically configurable) to receive packets on a particular port (e.g. TCP or UDP). In an embodiment, the target 34 can be indirectly addressable—for example, via a networking agent 35a, 35b providing an address translation function.

In an embodiment, one or more segments 40 can utilize the data communication methods as described in the present Applicant's PCT application no. PCT/AU2020/050244 (filed on 14 Mar. 2020, published as WO 2021/081575 A1 on 6 May 2021, the entire disclosure of this document is incorporated herein by reference). Also, communication between control agents 13 can be via previously created connections as according to the communication methods of the Applicant's earlier PCT application.

Referring to FIG. 5, a method is described in which a first entity 31a (i.e. associated with the first group 30a) communicates to its associated first control agent 13a an intention indicating that data communication with a target 34 of the second group 30b is desired.

An "intention" comprises a predefined data structure that can be received and processed by a receiving control agent 13 (i.e. the first control agent 13a in this example). The data structure is typically predefined such as to be suitable for processing by the particular control agent 13—therefore, different predefined data structures can be used when communicating with different control agents 13.

The intention is communicated to the first control agent 13a from the first computer 11a, at step 100. The first entity 31a can conceptually be a user of the first computer 11a—thus, it may be the user's credentials when entered into the first computer 11a that act to associate the entity with the computer 11. It should be understood that the intention can be communicated to the first control agent 13a without requiring explicit user action—for example, the generation of the intention can be automated. In a variation, an explicit communication with the first control agent 13a is not required—for example, the requirement can be a periodic requirement for the data communication and the first control agent 13a is automated to undertake the actions of the method without expressly receiving an intention.

In an embodiment, the first entity communicates with the first control agent 13a via a data channel between the associated first computer 11a and the first control agent 13a, for example, using an intranet on which both are located. It is envisaged that, in another embodiment, the first entity can communicate with the first control agent 13a using other means—for example, via the entity (being a user) communicating verbally with a system operator (another user) of the first control agent 13a—the system operator is then able to input into the control agent 13a the relevant details of the intention. The first computer 11a and the first control agent 13a can comprise separate processes running on the same hardware—in this case, the data channel can correspond to a shared memory pipeline or shared memory workspace.

According to an embodiment, at step 101, the first control agent 13a will then process the intention in order to identify that the second control agent 13b is associated with the target 34 (e.g. determined in accordance with the request). In this way, the first control agent 13a also identifies the second group 30b. For example, the request can specify the second group 30 or the second control agent 13b explicitly. In another example, the first control agent 13a can have previously been provided control agent cross-referencing information enabling cross-referencing between the target 34 and its associated control agent 13b. For example, the first control agent 13a can maintain a table or other database structure ("control agent cross-reference database") associating particular targets 34 with particular control agents 13.

In an embodiment, the first control agent 13a can be in data communication with the second control agent 13b such as to receive changes in cross-referencing information—for example, when the second control agent 13b makes a change to the cross-referencing information, this can be propagated over the data communication to the first control agent 13a. The first control agent 13a can be provided access to only a sub-set of the cross-reference information held by the second control server 13b; for example, only that cross-reference information authorized for use by the first control server 13a.

The first control agent 13a can then determine a request format for making a request to the second control agent 13b, and generates a request, at step 102. A request is a predefined data structure for communication between the first control agent 13a and the second control agent 13b. The request format can be standard for all control agents 13 or can be specific to the particular second control agent 13b. The request format defines certain data items which must be part of the request and, in an embodiment, certain optional data items. The request format should thereby ensure that the request is suitable for identifying the target 34—in an embodiment, the request includes a target ID suitable for enabling the second control agent 13b to determine the correct target 34.

The first control agent 13a then communicates the request to the second control agent 13b, at step 103. For example, the request is communicated via the Internet (e.g. as a part of network 15), although other means of communication are envisaged (such as via a portable solid-state storage device). The first control agent 13a and second control agent 13b can in fact correspond to separate processes running on the same hardware—in this case, the data channel can correspond to a shared memory pipeline or shared memory workspace.

As a result of the exemplary method of FIG. 5, a request is communicated by the first control agent 13a associated with the requestor 33 to the second control agent 13b associated with the target 34.

FIG. 6 shows a method implemented by the second control agent 13b in relation to the request sent by the first control agent 13a. At step 200, the second control agent 13b receives the request via the predefined channel.

The second control agent 13b then processes the request to identify the target 34 associated with the request, at step 201. In an implementation, a target ID can specifically define a target 34 by reference to the particular second computer 11b on which the target 34 is running. In another implementation, the second control agent 13b is required to determine the correct second computer 11b associated with the target 34 based on the target ID. For example, the target ID can comprise a user identifier, in which case the second control agent 13b is required to identify the second computer 11b presently associated with the user identifier (this could change, for example, where a user utilizes different computers 11 in different locations). In another example, the target ID can comprise a temporary identifier, for example which had been provided to the first entity 31a—this can be particularly useful where the first entity 31a is an IT support professional or the like and only requires temporary access to a particular target.

According to an embodiment, at step 202, the second control agent 13b applies a permission check to determine if the request satisfies predefined requirements—only in response to determining that the predefined requirements are satisfied will the second control agent 13b continue to step 203—that is, continue in creating a pathway 32 between the target and requestor 33. The permission check can be based on information present within the request. The permission check can include a consideration of the first entity 31a, the first computer 11a, and/or the first group 30a.

In an embodiment, the permission check can include an active check where a defined authorized entity 31 is required to provide permission after the second control agent 13b receives the request. For example, an approval request is sent to an entity 31 authorized to provide approval for the creation of a pathway 32—for example, a manager. This can be communicated in any suitable manner, for example via email. In a particular example, the authorizing entity 31 can have receive a notification on a device (e.g. a smartphone)—the notification can provide facility for the authorizing entity 31 to provide approval (which is communicated to the second control agent 13b), thereby satisfying at least a portion of the permission check.

At step 203, the second control agent 13b then determines a second segment 40b—that is, the portion of the pathway 32 associated with the second group 30b, for enabling communication between the requestor 33 (which is external to the second group 30b) and the target 34, which as previously discussed, is associated with a second computer 11b.

Referring back to FIG. 6, the second control agent 13b then sends internal configuration instructions to the one or more configurable second networking agents 35b of the second segment 40b, at step 204. The configuration instructions are configured to enable the one or more second networking agents 35b to, effectively, create the second segment 40b.

According to an embodiment, at step 205, the second control agent 13b sends external configuration instructions to the first control agent 13a. The external configuration instructions are configured such as to enable creation of the first segment 40a associated with the first group 30a. For example, the external configurations can provide suitable instructions to enable the first segment 40a to correctly connect to the second segment 40b. Said another way, the external configuration instructions are suitable for enabling the first computer 11a to successfully communicate with the second computer 11b. For example, the configuration instructions can specify a target IP address and/or a target port. In an embodiment, the second control agent 13b can be enabled to communicate the configuration instructions directly to the first computer 11a (that is, bypassing the first control agent 13a). For example, the request generated at step 102 can include communication information to enable the second control agent 13b to communicate directly with the first computer 11a.

According to the methods of FIG. 5 and FIG. 6, the first and second controls servers 13a, 13b are enabled to dynamically create specific point to point data connections between computers 11 in different groups 30 (thus, for example, on different intranets). The methods can also be utilized to enable specific point to point data connections between computers 11 in different subnets on the same intranet. These data connections can advantageously be application specific—therefore, minimal access rights are inherently applied. For example, the data connections are configured for communication to a specific application (e.g. by registering a particular UDP or TCP port), optionally with additional networking agents 35 configured for the specific communication.

FIG. 4 shows networking agents 35a, 35b. In particular, there are included one or more configurable networking agents 35a, 35b (preferably at least one for each segment 40). The pathway 32 is created by configuring these one or more configurable networking agents 35a, 35b—without said configuration, data communication between the requestor 33 and the target 34 is not enabled. The embodiments described herein allow for a variety of configurable networking agents 35a, 35b satisfying this requirement. In this way, embodiments described herein may advantageously provide a means for targeted data communications between the requestor 33 and the target 34. Several embodiments comprising example configurable networking agents 35a, 35b are described below.

Figure 7:
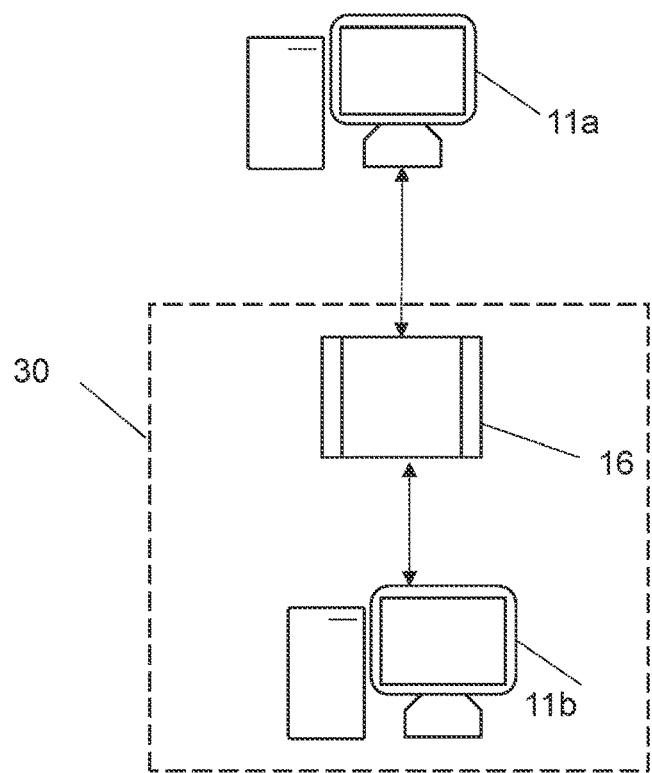
FIG. 7 shows an embodiment comprising a firewall as a configurable networking agent.

Referring to FIG. 7, in an embodiment, a configurable second network agent 35b is a firewall 14b of the second group 30b. In one example, the second computer 11b can be instructed to allow communications on a particular port associated with the target 34 (e.g. a VNC port)—this can be achieved by configuring a firewall application (being the relevant configurable second networking agent 35b) running on the second computer 11b. In another example, the target application 34 itself is configured to listen on a particular defined port—in this case, the target 34 is also a configurable second networking agent 35b. In another example, a firewall is implemented by separate hardware (or a separate virtual computer) to the second computer 11b, and is configurable to allow packets originating from the first computer 11a, e.g. packets associated with a particular port, through to the second computer 11b.

Figure 8:
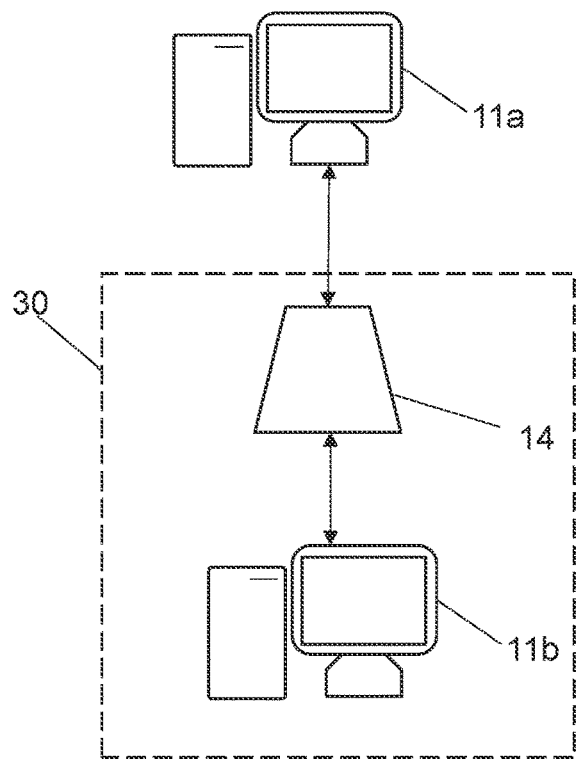
FIG. 8 shows an embodiment comprising a NAT as a configurable networking agent.

Referring to FIG. 8, in an embodiment, a NAT server 14b associated with the second group 30b can be configured to implement port forwarding for packets received specifically from the first computer 11a addressed to a specific port, such that packets received from network 15 directed towards that port are forwarded to the second computer 11b.

In an embodiment, a configurable second networking agent 35b corresponds to an authentication protocol. The purpose of such a protocol is to require the entity 31a associated with the first computer 11a to undertake an authentication procedure (e.g. two-factor authentication). An advantage of the present embodiment may be that only one authentication protocol is required for a particular group 30, rather than for each computer 11. The authorization protocol can be configured to provide feedback, either to the relevant control agent 13, the second computer 11b, and/or another computer 11 to confirm successful authentication. This can then cause the device(s) receiving feedback to implement its part of the pathway (such that the pathway only completes after successful authentication).

In an embodiment, the segments 40a, 40b are configured with complementary encryption protocols (e.g. AES). Thus, the requestor 33 and the target 34, as applications, are not required to implement security themselves—this is addressed as part of the pathway 32. This embodiment is an example of configuration actions required in both the first segment 40a and the second segment 40b—this is achieved by the internal configuration instructions (those for configuring the second segment 40b) and the external configuration instructions (those for configuring the first segment 40a).

In an embodiment, the segments 40a, 40b can be linked using an external rendezvous point server (not shown). For example, this can be applicable where the requestor 33 and/or target 34 are behind a firewall 16 or NAT server 14 which cannot be explicitly configured to allow communications. In this case, the rendezvous point server can provide an outbound meeting point for both the requestor 33 and target 34—once both are connected with the rendezvous point server, a connection can be facilitated (the rendezvous point server does not necessarily take part in further ongoing communications). An example of such a process is the "connection server" embodiment described in PCT/AU2020/050244.

According to an embodiment, the pathway 32 has a timeout or other limit to its existence (e.g. the pathway 32 can be cancelled). That is, the configurable features of the pathway 32 are configured such that, after the timeout or limit is reached, they will no longer pass data packets from the first computer 11a to the second computer 11b. The second control agent 13b, for example, can configure one or more of the configurable second networking agents 35b to only allow communication until the timeout is reached. In another example, the second control agent 13b itself can monitor for the timeout and send further internal configuration instructions to the second networking agent(s) 35b to cease allowance of the communication.

According to an embodiment, the pathway 32 can be cancelled via a command received at either control agent 13—for example, a system operator associated with a control agent 13 can elect to cancel the pathway. In another example, an entity 31 associated with one of the computers 11 can communicate its associated control agent 13 (e.g. via a command sent by the computer 11 or another device) to request that the pathway 32 be cancelled—the control agent 13 cancels the pathway 32 in response. When a control agent 13 takes an action to cancel a pathway 32, it can inform via data communication the other control agent 13. The action taken by the control agent 13 can include sending a configuration instruction to one or more of its associated networking agents 35a, 35b to cause the pathway 32 to cease.

According to an embodiment, the first control agent 13a and second control agent 13b communicate capability information between themselves before the creation of the pathway 32. For example, multiple segments 40 can be possible within the context of the first group 30a and/or the second group 30b. Additionally, only a subset of the possible segments 40 can be suitable for creating the pathway 32—for example, either the first segment 40a and/or second segment 40b can be limited in the network protocols available. By sharing this information, the second control agent 13b can generate the external configuration instructions such as to be compatible with the capabilities of the first group 30a. Additionally, the internal configuration instructions are also generated to ensure compatibility between the segments 40a, 40b.

Figure 9:
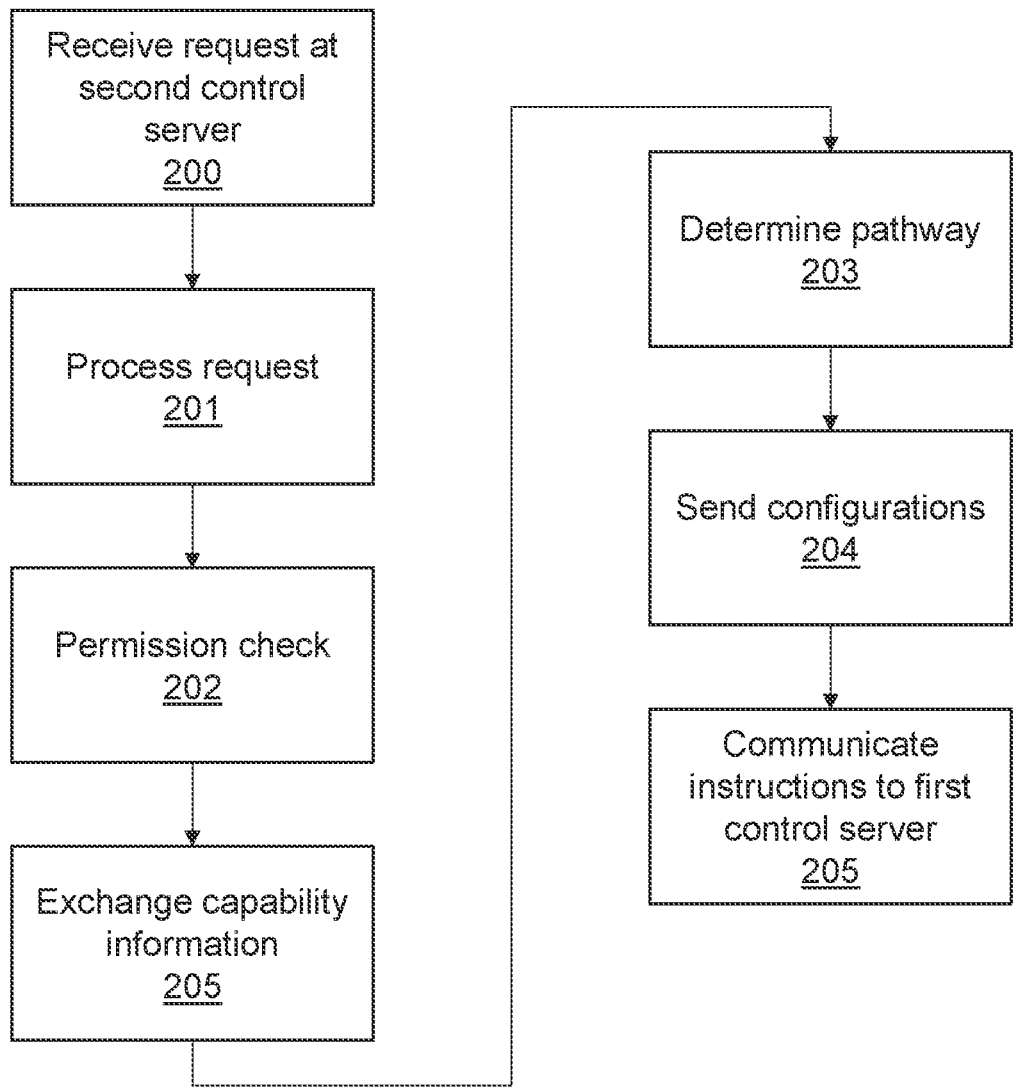
FIG. 9 shows a modification to the method of FIG. 6 including a capability exchange step.

Referring to FIG. 9 (which is a modification of FIG. 6), the optional additional step 206 enables the exchange of capability information. However, in another embodiment, the control agents 13a, 13b undertake the exchange of capability information as a separate process to any individual pathway generation. For example, the control agents 13a, 13b can send updated capability information to one another when capabilities change.

The embodiments described herein may advantageously provide a simplified process for matching business agreements enabling communication between different organizations (or even between subnets within a single organization) with the technical requirements for such connections. This is achieved by enabling the control agents 13 to be responsible for implementing the various technical requirements rather than requiring each individual computer 11 to be preconfigured.

For example, an agreement is made that an entity 31a of the first group 30a is entitled to access a specific application running on one or more computers 11b of a second group 30b (i.e. specific target(s) 34). For example, in the context of tech-support, the specific application can be a remote desktop or VNC server. Since the entity 30a can be a person who can use different computers 11a of the first group 30a, it can be difficult to configure each computer 11a for such a connection. Similarly, it can be difficult to configure each computer 11b of the second group 30b to accept connections from this entity—especially when the connections can arise from different computers 11a.

The embodiments herein described may be advantageously utilized to enable system operators of control agents 13 to implement policy decisions made by group administrators. Here, a group administrator is associated with a particular group 30 and is a decision maker authorized to decide policy (such as agreements between group administrators of different groups 30). The system operator can implement the policy by configuring the associated control agent 13 such as to define authorized entities 31 of other groups 30 which can access particular targets 34 of the associated group 30. For example, the particular access rights and particular targets 34 for a particular entity or class of entity can be defined within the control agent 13. Additionally, the system operator can be enabled to ensure that the segments 40 which are created by the associated control agent 13 include required networking agents 35a, 35b—for example, ensuring security matches policy. In another example, the control agent 13 can be configured to ensure appropriate logging of incoming connections and the like.

Existing techniques may provide the entity 31a with VPN logon details or similar. However, such existing techniques require sophisticated authentication and permission management, as they may operate on the basis of providing extensive access to an intranet which must then be restricted. Embodiments described herein provide targeted access to specific targets 34 (e.g. applications) operating on specific computers 11 on an as-needed basis. Such an approach may be inherently secure as the access is not required to be restricted from a more extensive access.

Another potential advantage of embodiments described herein is that the intranet (for example) associated with a group 30 can be modified while still enabling direct point-to-point communications between computers 11 associated with different groups 30. For example, only the control agent 13 associated with a particular group 30 in which changes are made needs to be updated—no update is required at another group 30.

Another potential advantage is that the underlying data transport mechanism can be arbitrary—that is, the entity 31, the particular requestor 33, and/or target 34 may not be required to have any knowledge of the transport mechanism. Instead, the control agents 13, on a case-by-case basis, create suitable pathways 32 (via the individual segments 40) to enable connection—these can use IPv6 in one instance and IPv4 in another instance. Similarly, TCP can be used in one instance and UDP in another. As each pathway 32 can therefore be created dynamically when required, any changes to the underlying protocols or network infrastructure can be hidden. For example, the particular security protocols implemented (as networking agents 35) can depend on whether the connection comprises a public wireless network or not.

Another potential advantage of embodiments herein described may be reduced security complexity—for example, rather than requiring sophisticated firewall or NAT rules to address all possible incoming connections, firewalls and/or NAT server 14 are configured as needed to enable a connection between computers 11*a*, 11*b* associated with different groups 30*a*, 30*b*, thereby reducing the risk of a fraudulent connection.

Similarly, an advantage may arise in that the control agents 13 are responsible for implementing security protocols rather than the requestor 33 and target 34 applications. This may advantageously assist to ensure that organization security rules are followed.

In an embodiment, a control agent 13 is configured to maintain a target cross-reference database ("target database"). The target database is configured to enable the control agent 13 to cross-reference between a received target ID and a particular computer 11 within its group 30. The target database can then be updated to reflect a change in the computer 11 associated with a particular target ID. For example, where a user receives a new computer 11 or uses more than one computer 11. The control agent 13 can be updated manually—for example, by an IT manager upon providing another employee with a new computer 11. The control agent 13 can also, or instead, be updated automatically—for example, during a login process for connecting to an enterprise network, a message is communicated to the control agent 13 to cause it to update the target ID. In an embodiment, the target ID is simply a username of a user of a network. However, it is envisaged that other codes can be utilized. Control agents 13 can communicate updated target information between themselves, thereby enabling a first control agent 13*a* to maintain a target database of targets 34 at the second control agent 13*b*.

In an embodiment, a target ID is dynamically generated—for example, for a particular use case. In this case, for example, a computer 11 can communicate to its control agent 13 the need for the creation of a temporary target ID. This can then be provided to the entity of the other group 30 to facilitate communication.

Figure 10A:
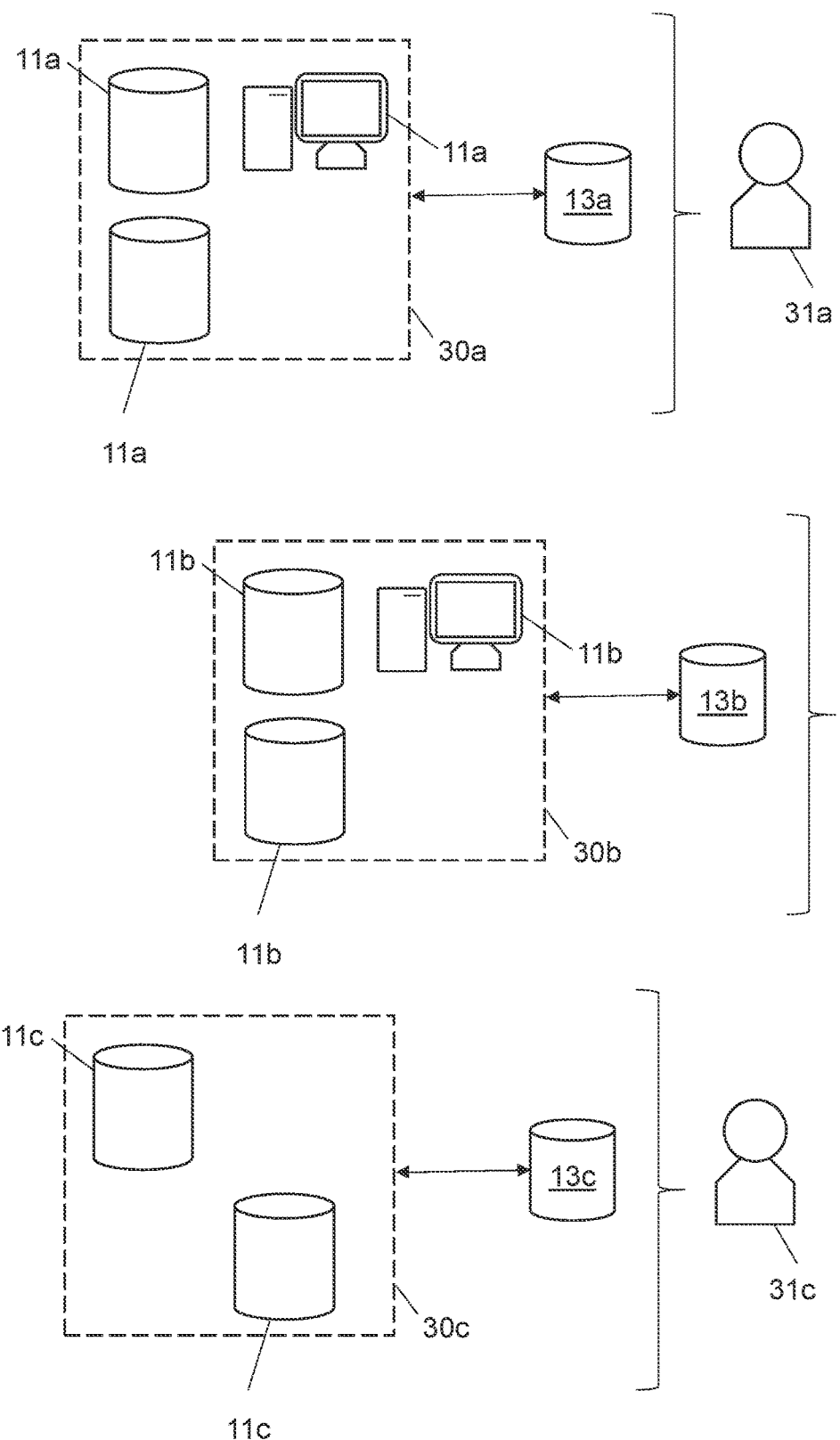

According to an embodiment, with reference to FIGS. 10A and 10B, an embodiment utilizes one or more additional control agents 13*c* to assist in forming the pathway 32 between the requestor 33 and the target 34. According to this embodiment, a second control agent 13*b* can be configured to receive requests for targets 34 where the application corresponding to the target 34 (and, for example, the corresponding computer 11) is not within the corresponding group 30. Such targets 34 can be termed proxy-targets—these can be stored in a suitable data structure accessible to the control agent 13*b*. However, the first control agent 13*a* also determines that the request should be sent to an additional control agent 13*c* rather than the second control agent 13*b* associated with the second group 30*c*. Information indicating the additional control agent 13*c* as the recipient of the request can be stored in memory accessible to the first control agent 13*a*. However, the first control agent 13*a* can instead be configurable to determine the additional control agent 13*c* as the recipient—for example, by making an inquiry of the second control agent 13*b* and receiving information identifying the additional control agent 13*c* as the target.

In this scenario, the additional control agent 13*c* is preconfigured such as to identify the target 34 as a proxy-target of the additional control agent 13*c*. It may not necessarily be required that the first control agent 13*a* has access to information identifying the second control agent 13*b* as associated with the target 34—i.e. the first server 13*a* can be configured to treat the additional control agent 13*c* as associated with the target.

According to an embodiment, the first control agent 13*a* undertakes the methods herein described to form a first segment 40*a* to connect to a third segment 40*c* of the additional control agent 13*c*. The formation of the connected first segment 40*a* and the third segment 40*c* does not, however, necessarily create a complete pathway 32 to the target 34.

The additional control agent 13*c* makes a request to the second control agent 13*b*—the information identifying the proxy-target of the additional control agent 13*c* can specify the second control agent 13*b* as associated with the actual target 34, thereby enabling the additional control agent 13*c* to be able to identify the second control agent 13*b*.

According to an embodiment, the additional control agent 13*c* then undertakes the methods herein described to form the second segment 40*b*—conceptually, this can be thought of as connecting to the third segment 40*c*. As a result, the requestor 33 is effectively now in data communication with the target 34 via the pathway 32 comprising the three segments 40*a*, 40*b*, 40*c*. Segments 40*a* and 40*c* can be considered "adjacent" (and segments 40*b* and 40*c* can also be considered "adjacent"). Segments 40*a* and 40*b* in this embodiment are "non-adjacent"—as they are connected in pathway 32 by segment 40*c*.

According to this embodiment, configurable additional networking agents 35*c* of the third group 30*c* can continue to be involved in a communication between the requestor 33 and the target 34. However, in another embodiment, the additional control agent 13*c* is only involved in setting up a data connection between the requestor 33 and the target 34 and does not actually take part in ongoing communications.

This embodiment can be extended to include further additional control agents 13*c*—in effect, a chain of segments 40 can thereby be created.

The embodiment of FIG. 10 may advantageously enable delegation of permissions. For example, a third entity 30*c* associated with the additional control agent 13*c* can have an agreement with a second entity 30*b* associated with the second control agent 13*b*—for example, to access a resource (e.g. database) or application (e.g. VNC server). The second control agent 13*b* and additional control agent 13*c* are therefore configured to set up pathways 32 between each other to enable access to the resource or application. However, the third entity 30*c* can desire to be able to delegate to an entity 30*a* associated with the first control agent 13*a*. The present embodiment may advantageously enable such delegation while ensure that any network connection rules (e.g. security, logging, etc.) are correct according to the agreement between the second and third entities 30*b*, 30*c*. In the particular example of delegation, there can be a requirement in the agreement that delegation is allowable.

According to these embodiments, the internal and external configuration instructions can specify requirements for creating the pathway that apply between adjacent control agents 13 as well as non-adjacent—for example, in the case of security, the data communication between the requestor 33 and the target 34, once formed, can require end-to-end encryption. This information is shared between the first group 30*a* and the second group 30*b* via the additional control agent 13*c* (which is not part of either group 30*a*, 30*b*).

Figure 11:
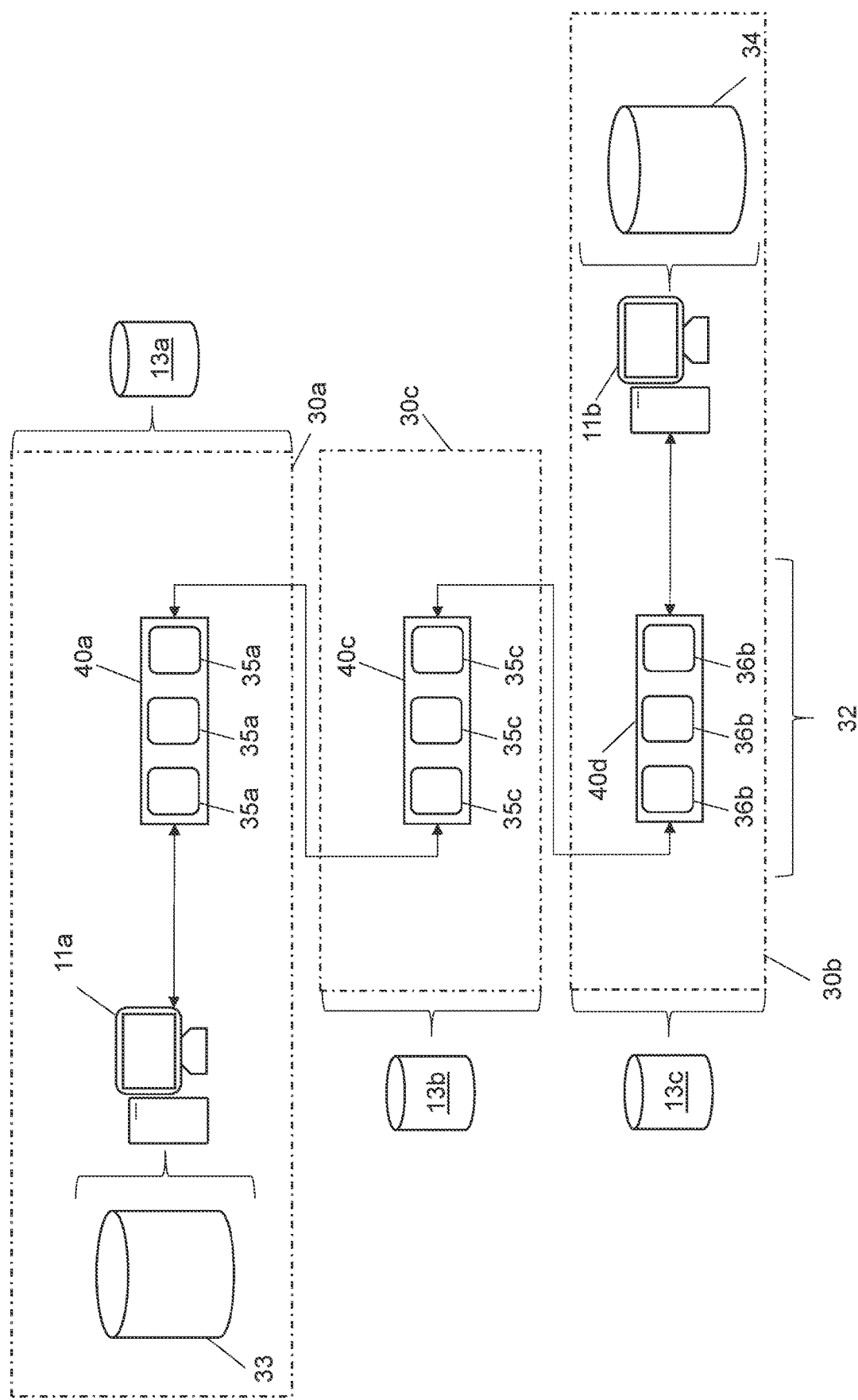
FIG. 11 relates to a use case of the embodiment of FIG. 10.

FIG. 11 shows a use-case of the embodiment of FIG. 10, where the first segment 40*a* is associate with a first group 30*a*, the second segment 40*b* with a second group 30*b*, and the additional can be that a first combination of communication protocols is utilized between the first segment 40*a* and the third segment 40*c* with a third group 30*c* (the third segment 40*c* can be considered an "additional segment 40*c*" as it is associated with the additional control agent 13*c*).

An advantage of this arrangement may be that the third group 30c and the second group 30b define certain communication protocols (e.g. security, encapsulation, addressing, NAT traversal, etc.) whereas the third group 30c and the first group 30a define different communication protocols. Therefore, when the first computer 11a attempts to create a connection to the target 34 (which can be a proxy-target), it communicates according to its agreement with the third group 13c—the first computer 11a is not required to "know" about the communication requirements between the second group 13b and the third group 13c. Similarly, the second computer 11b is not required to "know" about the communication requirements between the first group 13a and the third group 13c. Thus, for example in a delegation arrangement, the embodiment may advantageously allow the third group 13c to manage different communication requirements. For example, where a rendezvous server is required, this can only be between the first group 13a and the third group 13c (or, only between the second group 13b and the third group 13c).

In an embodiment, one or more control agents 13 are configured to publish to other control agents 13 available target information enabling a recipient control agent 13 to identify one or more targets 34 available associated with the publishing control agent 13. The target information can optionally define a publish validation time, indicating a period of time for which the published information is to be considered valid by a recipient control agent 13. A recipient control agent 13 can be configured to update or override, in part or in entirety, previously received target information published by a particular control agent 13. The target information can therefore correspond to the previously mentioned control agent cross-referencing information, and can, in relevant implementations, be utilized to update a control agent cross-referencing database.

In an implementation, a control agent 13 is enabled to publish target information in a manner generally accessible by one or more other control agents 13—for example, defined by a non-secret Uniform Resource Identifier (URI), which can be a Uniform Resource Locator (URL). Other examples include storing suitable information in a DNS TXT record and providing a known email address which auto-replies to enquiries with the target information. The target information can be published in a manner enabling controlled access to the content of the target information. For example, the target information can be encoded using known techniques such that each control agent 13 is only enabled to decode portions of the target information to which it has authorized access. In an event, a particular control agent 13 can be instructed to access the public target information (e.g. by being directed to a known URL), which is then parsed to identify portions of the target information relevant to the particular control agent 13 (which can be a subset or, if not controlled, the entire target information), which then updates its control agent cross-referencing information. In another example, the control agent 13 can selectively communicate portions of the target information in response to requests from particular control agents 13, the portions determined according to the identity of the requesting control agent 13. In this way, particular control agents 13 are enabled to obtain suitable cross-referencing information from other control agents 13.

In an embodiment, which can be applicable for example in embodiments utilizing additional control agents 13c such as described with reference to FIGS. 10A, 10B, and 11, a particular control agent 13 is enabled to publish target information of another control agent 13. For example, in FIG. 11, the second control agent 13b of second group 30b can provide target information associated with one or more targets 34 associated with it to the additional control agent 13c of third group 30c. The third control agent 13c can then publish the target information associated with the second group 30b, which is accessible to the first control agent 13a of first group 13a. Advantageously, the first control agent 13a may not be required to "know" about the relationship between the second group 30b and the third group 30c as such, instead, it is made aware that one or more targets 34 of the second group 30b are accessible via the additional control agent 13c of the third group 30c. Another advantage may be that the additional control agent 13c can effectively provide a target information forwarding function.

In an implementation, system 10 is arranged such that a particular control agent 13 is barred from generally publishing its target information and can only do so via communication with an authorized other control agent 13—for example, in FIG. 11, second control agent 13c is barred from publishing directly to first control agent 13a (or, in fact, any other unauthorized control agent 13) and must instead provide the target information to the authorized additional control agent 13c, which applies its own rules before publishing the received target information (which may act to limit the target information so-published, for example, by adding conditions as to which groups 30 and/or particular computers 11 or requestors can have access to certain targets 34). Advantageously, this implementation may allow for a dedicated control agent 13 for publishing target information which can thereby provide additional security and/or ease of implementing business rules related to which target information can be published and to which control agents 13.

A particular computer 11 or requestor 33 of a group 30 can be provided available target information from its associated control agent 13, the available target information derived from the target information provided to the control agent 13 but is further limited based on conditional rules. For example, a certain computer 11 or requestor 33 may only have access to a subset of the targets 34 of another group 30, and its control agent 13 manages the subset by limiting the available target information made available to that particular computer 11 or requestor 33. In fact, a first group 30a may have limited access to targets 34 of a second group 30b, as defined by the portion of target information made available to the first control agent 13a of the first group 30a, and particular requestors 33 of the first group 30a can have further limited access to targets 34 of the second group 30b—only that present in the available target information communicated from the first control agent 13a to the requestor 33. Therefore, advantageously, both the second control agent 13b and the first control agent 13a control, by limiting, the available targets 34 of the second group 30b available to the particular computer 11 or requestor 33 of the first group 30a. In fact, a third control agent 13c can also limit the available targets 34 as described above. The limitations can, at least in part, relate to specific permissions being granted for particular requestors 33, computers 11, and/or groups 30 having access to targets of a particular group 30. Permission can be granted, for example, via an authentication procedure by which the target information is determined to be made available to a particular requestor 33, computer 11, and/or group 30.

Referring back to FIG. 5, in an embodiment, where the intention communicated to first control agent 13a identifies a particular second control agent 13b, associated with an intended target 33, directly, if the first control agent 13a does not have control agent cross-referencing information associated with the second control agent 13*b*, then it can request target information from the second control agent 13*b* (via the information identifying the second control agent 13*b* in the intention) or can seek published information (e.g. by accessing a suitable URL as described above). If applicable, the target information can in fact be sought from a suitably authorized third control agent 13*c*. In this way, groups 30 can be "added" to the first control agent 13*a* when needed (that is, information identifying the respective other control agents 13 can be stored for future use by the control agent 13)—the first control agent 13*a* thereby effectively builds a database of available control agents 13 and their corresponding groups 30 and target(s) 34.

Although the discussion herein has assumed the requestor 33 is related to a first computer 11*a* and the target 34 is related to a physically or logically distinct second computer 11*b*, in an embodiment, a requestor 33 and target 34 can be applications running on the logically same computer 11 (i.e. within the same operating environment, not as distinct virtual servers). The one or more segments 40 required therefore may not require data communication via an external network 15 (although, in certain circumstances, the data communicating may include the external network 15)—however, due to the nature of the applications or the configuration of the computer 11 on which they are running, communication via one or more segments 40 managed by respective control agents 11 is required. In this case, the first control agent 11*a* and the second control agent 11*b* can be operating on the same computer 11 as the requestor 33 and target 34, although one or both can be implemented on external computers 11.

It should be understood that the labels "first", "second", and the like as used herein are intended to distinguish the relevant features when describing particular roles and process implemented by those features. However, it should be understood that the implementations may take on the different roles at different times—for example, the particular control agents 13 can undertake the described actions of both first and second control agents 13*a*, 13*b* during actual operation, depending on the particular circumstances.

Further modifications can be made without departing from the spirit and scope of the specification.

For example, certain embodiments herein may be extended to include a requestor 33 and target 34 being associated with a same group 30 and therefore the first control agent 13*a* and the second control agent 13*b* are in fact the same; these can be understood relating to a "common" control agent 13. In this case, the common control agent 13 is configured to cause a creation of a pathway 32 between the requestor 33 and the target 34; that is, the common control agent 13 can communicate configuration instructions to one or more configurable networking agents 35. Due to the control agent 13 being common, the configuration instructions can be considered both internal and external—that is, conceptually, certain configuration instructions can be external configuration instructions from the "perspective" of the requestor 33 and internal configuration instructions from the "perspective" of the target 34. Similarly, conceptually, certain configuration instructions can be internal configuration instructions from the "perspective" of the requestor 33 and external configuration instructions from the "perspective" of the target 34. In this modification, one or more additional control agents 13*c* can be involved with the pathway 32, despite the requestor 33 and target 34 being within the same group 30; this simply implies the communications between the requestor 33 and target 34 involve communications directed outside of the specific group 30 comprising the requestor 33 and target 34.

The invention claimed is:

1. A method for creating data communication between a requestor and a target, wherein: the requestor is associated with a first group and a first control agent; and the target is associated with a second group and a second control agent, the method comprising the steps of:
   receiving, at the first control agent, an intention to connect to the target from the requestor;
   identifying the second control agent as associated with the target and generating a request;
   communicating the request to the second control agent from the first control agent;
   receiving, from the second control agent, external configuration instructions;
   selecting, at least in part in accordance with the received external configuration instructions, one or more configurable first networking agents of the first group requiring configuration in order to create that data communication;
   determining, at least in part in accordance with the received external configuration instructions, first networking configuration instructions for each of one or more configurable first networking agents; and
   communicating said instructions to the, or each, said configurable first networking agents, thereby creating a first segment for connection to a second segment create by the second control agent.

2. The method of claim 1, wherein the data communication is over, at least in part, a data network such as the Internet or wherein the data communication is via a memory shared by the requestor and the target.

3. The method of claim 1, wherein the request comprises a predefined data structure suitable for processing by the second control agent.

4. The method of claim 1, wherein the requestor is also a configurable networking agent and is identified as required for creating the data communication.

5. The method of claim 1, wherein the external configurations specify an IP address and/or port for outgoing communications, and wherein the requestor is a configurable networking agent and is configured to address outgoing packets to said IP address and/or port.

6. The method of claim 5, wherein the external configurations specify an IP address and/or port for outgoing communications, wherein at least one configurable networking agent is configured to address outgoing packets to said IP address and/or port.

7. The method of claim 1, wherein:
   at least one configurable networking agent comprises a security protocol and the first networking configuration instructions include configuring the security protocol;
   at least one configurable networking agent comprises a firewall and the first networking configuration instructions include information to configure the firewall to enable communications from the target to reach the requestor;
   at least one configurable networking agent comprises a NAT and the first networking configuration instructions include information to configure the NAT to enable communications from the target to reach the requestor; and/or
   at least one configurable networking agent comprises a logger for logging data transmitted between the requestor and the target, and the first networking configuration instructions include information to configure the logger.

8. The method of claim 1, wherein at least one configurable networking agent is configured to communicate with a rendezvous point server and the first networking configuration instructions include instructions to enable communication with the rendezvous point server to facilitate setting up the data communication.

9. The method of claim 1, further comprising a step of: the first control agent exchanging capability information with the second control agent, wherein selecting the one or more configurable first networking agents and/or determining the first networking configuration instructions is based, at least in part, on the exchanged capability information.

10. The method of claim 1, further comprising the step of: checking permissions associated with the intention and ceasing creation of the data communication in response to determining that the permissions do not satisfy a permission requirement.

11. A method for creating data communication between a requestor and a target, wherein: the requestor is associated with a first group and a first control agent; and the target is associated with a second group and a second control agent, the method comprising the steps of:
receiving, at the second control agent, a request from the first control agent, wherein the request is for creating the data communication;
determining one or more configurable second networking agents of the second group requiring configuration in order to create that data communication;
determining second networking configuration instructions for each of one or more configurable second networking agents;
communicating the second networking instructions to the one or more configurable second networking agents, thereby creating a second segment;
determining external configuration instructions configured to enable the first control agent to create a first segment to connect to the second segment; and
communicating the external configuration instructions to the first control agent.

12. The method of claim 11, wherein:
at least one configurable networking agent comprises a security protocol and the first networking configuration instructions include configuring the security protocol;
at least one configurable networking agent comprises a firewall and the second networking configuration instructions include information to configure the firewall to enable communications from the requestor to reach the target;
at least one configurable networking agent comprises a NAT and the second networking configuration instructions include information to configure the NAT to enable communications from the requestor to reach the target; and/or
at least one configurable networking agent comprises a logger for logging data transmitted between the requestor and the target, and the first networking configuration instructions include information to configure the logger.

13. The method of claim 11, wherein at least one configurable networking agent is configured to communicate with a rendezvous point server and the second networking configuration instructions include instructions to enable communication with the rendezvous point server to facilitate setting up the data communication.

14. The method of claim 11, wherein selecting the one or more configurable second networking agents and/or determining the second networking configuration instructions is based, at least in part, on the received request.

15. The method of claim 11, further comprising the step of: the second control agent exchanging capability information with the first control agent, wherein selecting the one or more configurable second networking agents and/or determining the second networking configuration instructions is based, at least in part, on the exchanged capability information.

16. The method of claim 11, further comprising the step of: checking permissions associated with the request and ceasing creation of the data communication in response to determining that the permissions do not satisfy a permission requirement.

17. A method for creating data communication between a requestor and a target, wherein: the requestor is associated with a first group and a first control agent; and the target is associated with a second group and a second control agent, the method comprising the steps of:
receiving, at the first control agent, an intention to connect to the target from the requestor;
identifying, by the first control agent, the second control agent as associated with the target and generating a request;
communicating, from the first control agent, the request to the second control agent from the first control agent, wherein the request is for creating the data communication;
receiving, at the second control agent, the request from the first control agent,
determining, by the second control agent, one or more configurable second networking agents of the second group requiring configuration in order to create that data communication;
determining, by the second control agent, second networking configuration instructions for each of one or more configurable second networking agents;
communicating, by the second control agent, the second networking instructions to the one or more configurable second networking agents, thereby creating a second segment;
determining, by the second control agent, external configuration instructions configured to enable the first control agent to create a first segment to connect to the second segment; and
communicating, from the second control agent, the external configuration instructions to the first control agent;
receiving, from the second control agent, the external configuration instructions at the first control agent;
selecting, by the first control agent, at least in part in accordance with the received external configuration instructions, one or more configurable first networking agents of the first group requiring configuration in order to create that data communication;
determining, by the first control agent, at least in part in accordance with the received external configuration instructions, first networking configuration instructions for each of one or more configurable first networking agents; and
communicating, from the first control agent, said instructions to the, or each, said configurable first networking agents, thereby creating a first segment for connection to a second segment create by the second control agent.

18. The method of claim 17, further comprising the step of:

undertaking communications between the requestor and the target using a pathway corresponding to the created first segment and second segment.

19. A system comprising:

a first control agent defining a first group comprising at least one first computer; and a second control agent defining a second group comprising at least one second computer, wherein the first control agent and second control agent are configured to exchange data between each other, wherein the first control agent is configured to:
 receive an intention to connect to a target from a requestor, wherein the requestor is associated with a first computer of the first group and the target is associated with a second computer of the second group;
 identify the second control agent as associated with the target and generate a request; and
 communicate the request to the second control agent, wherein the second control agent is configured to:
 receive the request from the first control agent;
 determine one or more configurable second networking agents of the second group requiring configuration in order to create that data communication;
 determine second networking configuration instructions for each of one or more configurable second networking agents;
 communicate the second networking instructions to the one or more configurable second networking agents, thereby creating a second segment;
 determine external configuration instructions configured to enable the first control agent to create a first segment to connect to the second segment; and
 communicate the external configuration instructions to the first control agent, and wherein the first control agent is further configured to:
 receive the external configuration instructions;
 select, at least in part in accordance with the received external configuration instructions, one or more configurable first networking agents of the first group requiring configuration in order to create that data communication;
 determine, at least in part in accordance with the received external configuration instructions, first networking configuration instructions for each of one or more configurable first networking agents; and
 communicate said instructions to the, or each, said configurable first networking agents, thereby creating a first segment for connection to the second segment, thereby creating a pathway.

20. The system of claim 19, wherein the requestor and the target are applications running on their respective computers, and wherein the requestor and target are configured to undertake data communications according to the created pathway.

* * * * *